E. S. PETTIS.
DRUM FILTER WIRING.
APPLICATION FILED MAR. 5, 1919.
1,327,962.
Patented Jan. 13, 1920.
2 SHEETS—SHEET 1.
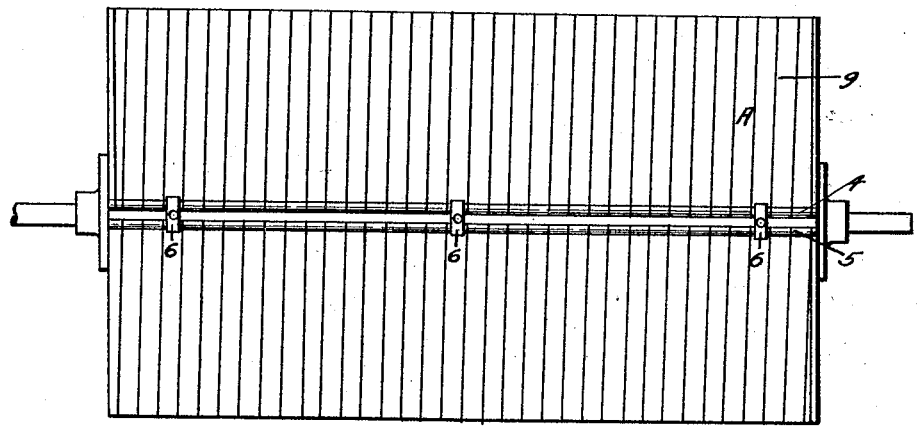
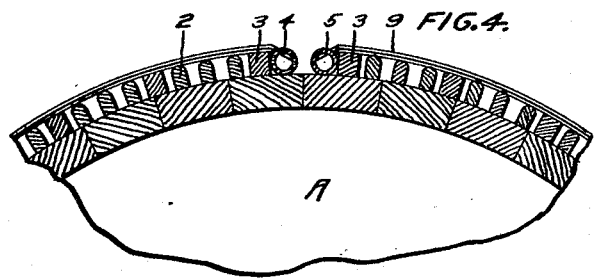
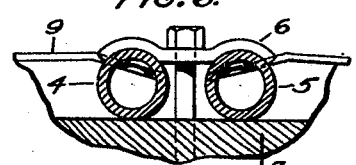
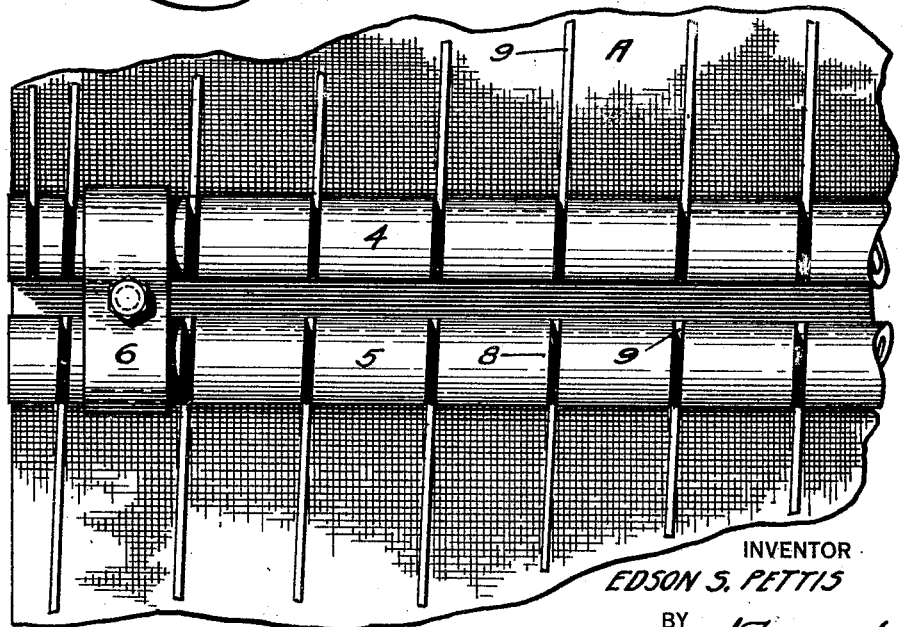
INVENTOR
EDSON S. PETTIS
BY
ATTORNEY

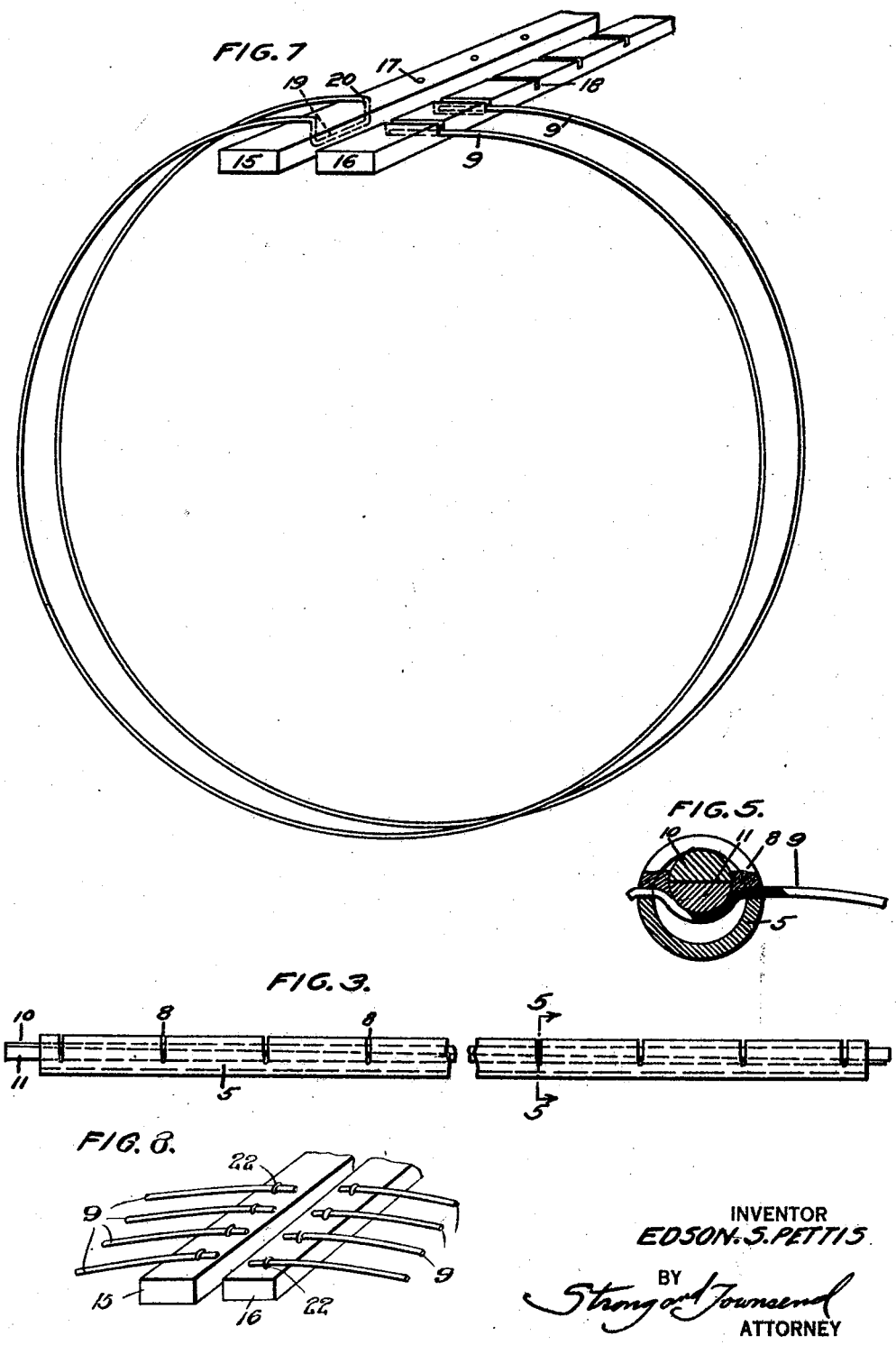

UNITED STATES PATENT OFFICE.

EDSON S. PETTIS, OF MILL VALLEY, CALIFORNIA.

DRUM-FILTER WIRING.

1,327,962.  Specification of Letters Patent.  Patented Jan. 13, 1920.

Application filed March 5, 1919. Serial No. 280,763.

*To all whom it may concern:*

Be it known that I, EDSON S. PETTIS, a citizen of the United States, residing at Mill Valley, in the county of Marin and State of California, have invented new and useful Improvements in Drum-Filter Wiring, of which the following is a specification.

This invention relates to that class of continuous rotary filters, in which a rotary drum, partially or wholly submerged in the material to be filtered, is provided with a filtering medium secured to the outer surface of the drum, through which the liquid component of the material to be filtered is drawn by suction and from which the adhering solids are removed by a scraper and reverse air pressure.

When treating certain classes of material, the filtering medium, usually a fabric, deteriorates very rapidly, thereby compelling constant removal and renewal of the filter drum fabric. Fabrics of this character are usually retained in place by a wire wrapping which also serves as a supporting surface for the scraper employed. The wire is generally wrapped helically from one end of the drum to the other and secured, and it is common practice to cut the wire which has worn but little during the short life of the fabric, so that it is wasted when unwound, thereby necessitating new wire or additional wire when rewinding. This method of operation not only incurs considerable expense as more or less skilled labor and considerable time are required, but it also promotes unnecessary waste of wire and other valuable material.

An object of the present invention is to overcome the objectionable features mentioned; first, by providing a wiring which can be quickly removed or applied; and, second, it permits the wire to be used over and over until completely worn. Further objects will hereinafter appear.

The invention consists of the parts and the construction and combination of parts as hereinafter more fully described and claimed, having reference to the accompanying drawings, in which—

Figure 1 is a plan view of a filtering drum, showing the application of the invention.

Fig. 2 is an enlarged detail view of the wire-securing means.

Fig. 3 is a side elevation of Fig. 2.

Fig. 4 is a partial cross section of the filtering drum, showing the position of the fabric, the wires and the wire-securing means.

Fig. 5 is a cross section on line 5—5 of Fig. 3.

Fig. 6 is a detail view of the pipe clamps.

Fig. 7 is a perspective view, showing a modification of the wire-securing means.

Fig. 8 shows another modification.

Referring to the drawings in detail, A indicates, in general, a filter drum, which is circular in cross section. Forming a covering for the drum are a series of slats 2 and 3, and extending lengthwise of the drum, between the slats 3, are a pair of pipe sections, as shown at 4 and 5, which are secured to the drum by means of clamps 6 (see Figs. 1 and 6). Each pipe employed is slotted, as at 8, to serve as a guide for the wire 9 when applied; and each pipe also serves as a receiver for a pair of wedge members 10 and 11 (see Figs. 3 and 5) which are provided for the purpose of tightening the wires after they have been wound.

In actual practice, it is desirable to provide a uniform spacing between the slots 8 and to so arrange the same that it is possible to wind the wire 9 helically from one end of the drum to the other (see Fig. 1). The wire thus wound about the drum is then tightened by inserting the wedges 10 and 11 and is then further secured by filling solder in each slot 8, thus securing the wires to the respective pipe sections 4 and 5. The fabric covering, usually some form of canvas, is thus tightly secured in position and the wiring will at the same time serve as a supporting face for the scrapers when these are employed.

The drum thus wired and prepared is now ready for use and may operate in the usual manner until the fabric has deteriorated to such an extent that renewal is necessary. This can be easily accomplished in the present instance as it is only necessary to cut the wires at points intermediate the pipe sections 4 and 5 (see Figs. 1 and 2). The pipe clamps 6 are then released and it is thus possible to remove the wiring as a whole by unwrapping the whole wiring as if it were a wire blanket covering the drum.

The wiring thus removed permits removal of the old fabric and also permits a new fabric to be placed in position. The pipe section 5 is then placed in position and the wire as a whole wrapped about the fabric until the pipe section 4 is placed in position. The pipe clamps are then placed in position and the whole operation of renewing the fabric and replacing the wiring is completed, an operation which permits the same wiring to be used over and over until entirely worn and which is accomplished with comparatively small loss of time.

A modified form of wire-securing means is shown in Fig. 7. In this instance a pair of straight bars 15 and 16 are employed as a substitute for the slotted pipe sections 4 and 5. The bar 15 is perforated at equal intervals, as shown at 17, while the bar 16 is merely slotted in its upper surface, as shown at 18, said slots being formed in alinement with the perforations 17.

In wiring a drum when bars are employed, it is only necessary to pass a wire end downwardly through one perforation 17, then under the bar, as shown at 19, and up through the succeeding perforation 17, as shown at 20; the length of wire employed being such that both ends may be wrapped around the drum and passed into the slots 18 formed in alinement with the perforations 17. The wires may here be drawn taut and then soldered into place.

This operation is continued until the entire drum has been wired and it will, therefore, be seen that the wiring is somewhat simplified and that the wires first of all assume loops positioned parallel with relation to each other and eliminate the necessity of soldering both ends, as each pair of coils or loops are secured at one end by passing them through the perforations 17 and at the opposite ends by soldering the same in the slots 18.

The bars may be secured by pipe clamps, as shown in Fig. 6, or by any other suitable fastening means. They may, therefore, be just as quickly and readily removed or replaced as the pipe sections 4 and 5 and they certainly serve the same functions previously described.

A further modification is shown in Fig. 8. In this instance it is necessary to perforate both bars and to secure the wires by passing staples 22 through the perforations and then soldering both the wires and the staples to the bars.

From the foregoing description it should be obvious that the wiring, whether secured to pipe sections, such as shown at 4 and 5, or to bars 15 or 16, can be readily and quickly removed or replaced as the numerous coils forming the wiring are all unwound in unison and all re-wound in unison when the parts are brought into place; and also that they may be used over and over until practically worn through by the scrapers. Considerable time can, therefore, be gained and expenses lessened, both as regards labor and material employed.

While a more or less specific structure is here shown, I wish it understood that these may be changed to suit varying conditions and also that the materials and finish of the several parts employed may be such as the experience and judgement of the manufacturer may dictate.

Having thus described my invention, what I claim and desire to secure by Letters Patent is—

1. In combination with a filtering drum, a filtering medium surrounding the drum, a pair of cross bars, a wire covering for the filtering medium secured at each end to the cross bars, and means for securing the cross bars to the drum.

2. In combination with a filtering drum, a filtering medium surrounding the drum, a wire covering for the filtering medium surrounding the drum, said wire covering being parted lengthwise of the drum to form two free ends, and means for securing the free ends of the wire covering to the drum.

3. In combination with a filtering drum, a filtering medium surrounding the drum, a wire covering for the filtering medium surrounding the drum, said wire covering being parted lengthwise of the drum to form two free ends, a cross bar secured to each free end of the wire covering, and means for securing said cross bars to the drum.

4. In combination with a filtering drum, a filter fabric surrounding the drum, a pair of cross bars extending lengthwise of the drum, said cross bars being interspaced and disposed parallel with relation to each other, a wire adapted to be wound helically from end to end of the drum and across the cross bars, slots formed in the cross bars for the reception of the wire, said slots permitting the wire to be soldered to the cross bars and also permitting the wires to be cut between the cross bars after they have been soldered to permit unwrapping of the wire as a whole, and means for securing the cross bars to the drum.

5. In combination with a filtering drum, a filter fabric surrounding the drum, a pair of pipe sections extending lengthwise of the drum, said pipe sections being interspaced and positioned parallel with relation to each other, a wire adapted to be helically wound from one end of the drum to the other, slots formed in the pipe sections for the reception of the wire as it is helically wound about the drum, a pair of wedge members insertible from the ends of the pipe sections to tighten the wire, said slots permitting the wire to be soldered to the pipe sections and also permitting each coil of the helical winding to be parted at a point intermediate the pipe sections so that all the coils of the wiring may be unwrapped in unison, and a series of pipe clamps adapted to secure the pipe sections to the drum.

In testimony whereof I have hereunto set my hand in the presence of two subscribing witnesses.

EDSON S. PETTIS.

Witnesses:
G. M. BALL,
J. H. HERRING.